United States Patent

Vasil

[11] Patent Number: 5,314,672
[45] Date of Patent: May 24, 1994

[54] COMPOSITION AND METHOD FOR SWEETENING HYDROCARBONS

[75] Inventor: James F. Vasil, Houston, Tex.

[73] Assignee: Sweetchem Corp., Houston, Tex.

[21] Appl. No.: 97,716

[22] Filed: Jul. 27, 1993

Related U.S. Application Data

[63] Continuation-in-part of Ser. No. 887,676, May 22, 1992, abandoned.

[51] Int. Cl.$^5$ ............................................. B01D 53/14
[52] U.S. Cl. ..................................... 423/228; 423/226
[58] Field of Search .................... 423/228, 229, 226; 208/207, 208 R

[56] References Cited

U.S. PATENT DOCUMENTS

| | | | |
|---|---|---|---|
| 2,596,273 | 5/1952 | Moyer et al. | 252/8.555 |
| 3,970,625 | 7/1976 | Moore et al. | 71/28 |
| 4,748,011 | 5/1988 | Baize | 423/228 |
| 4,877,578 | 10/1989 | Zetlmeisl et al. | 422/14 |
| 4,978,512 | 12/1990 | Dillon | 423/226 |

FOREIGN PATENT DOCUMENTS 411745 2/1991 European Pat. Off. ............ 423/228

Primary Examiner—John Zimmerman
Assistant Examiner—Peter T. DiMauro
Attorney, Agent, or Firm—Neal J. Mosely

[57] ABSTRACT

A method and composition are disclosed for sweetening, i.e., selectively reducing the levels of H$_2$S and organic sulfides, in gaseous hydrocarbons streams, particularly natural gas streams. A natural gas in a pipe line, at the well head, or at a common collection point from a number of wells, is contacted with a sweetening agent comprising the reaction product of ethylene diamine with 50% uninhibited aqueous formaldehyde. The reaction product is prepared by reacting one part 99% ethylene diamine with two parts 50% aqueous uninhibited formalin at a temperature of about 55–60° C. (higher temperatures may be used if the reaction is carried out under pressure) and is characterized by having a higher flash point, lower toxicity, and a lower freezing point, and better reaction rates, than other sweetening agents currently in use. The sweetening solution is water soluble, free from methanol or other alcohols, does not foam uncontrollably in use, and is free from water insoluble solids which would interfere with the injectability of the solution into a stream of flowing natural gas. The sweetening reaction takes place in-line without the need for a holding tank or reaction vessel. However, the treatment with the sweetening agent may also be carried out in a conventional gas treating tower. The reaction is complete and effective to completely sweeten a sour gas system.

10 Claims, No Drawings

COMPOSITION AND METHOD FOR SWEETENING HYDROCARBONS

CROSS REFERENCE TO RELATED APPLICATIONS

This application is a continuation-in-part of copending application Ser. No. 887,676, filed May 22, 1992, abandoned.

BACKGROUND OF THE INVENTION

1. Field of the Invention

This invention relates to improvements in the sweetening of natural gas, and more particularly to a method and composition for sweetening natural gas in a treating tower, or in a pipe line, or at the well head or a collection point in the field, the composition being characterized by having a higher flash point and lower freezing point than other sweetening agents currently in use and better reaction rates.

2. Brief Description of the Prior Art

The production of natural gas often requires the separation or removal of various contaminants from the gas before it can be sent on for use. Natural gas often includes a substantial amount of entrained water and vaporized liquid hydrocarbons, usually the more volatile ones. Consequently the gas is subjected to treatment for separation of these components.

Natural gas may also contain gaseous impurities such as $CO_2$ and $H_2S$ which are acids in aqueous solution and thus corrosive. $H_2S$-containing gas is also highly toxic and malodorous and is referred to as "sour" gas. In fact, $H_2S$ is more toxic than HCN and presents the problem that is highly malodorous at extremely low concentrations and tends to anesthetize the olfactory nerves with the result that a toxic exposure may not be recognized until it is too late. The removal or neutralization of $H_2S$ is therefore a matter of necessity from a safety standpoint.

The removal of $CO_2$ is not always required but can usually be removed by the other processes used to remove $H_2S$. In many processes of treatment, the chemicals used for sweetening react with both $CO_2$ and $H_2S$ and therefore the total amount of these impurities is used in calculating the amount of treating chemicals needed. In most procedures, the natural gas is first treated to remove water vapor and to separate condensable hydrocarbons or "condensate". The partial expansion of the gas through a choke to a lower pressure is effective to cool the gas sufficiently to remove both water and volatile hydrocarbons by condensing them from the gas stream. Often, there is material added, such as ethylene glycol, which will absorb or hydrate with the water to condense more readily from the gas stream. The expansion through the choke and consequent cooling is usually sufficient to condense the volatile liquid hydrocarbons which are recovered for use as solvents or fuel, i.e. casing head gasoline.

The technology known in the art for removing $H_2S$ from raw natural gas was developed for large processing plants to remove $H_2S$ in continuous processes. These large processing plants are fed by one or more natural gas wells, each of which may produce over 10 million cubic feet of natural gas per day. Many of these processes utilize commodity chemicals or proprietary materials to lower the $H_2S$ levels in natural gas to pipeline specifications. Also, many of these processes not only sweeten sour natural gas to pipeline specifications, but also regenerate most, if not all, of the sweetening compositions involved.

A major process for removal of acid constituents from natural gas is one using an alkanolamine, such as monoethanolamine (MEA), diethanolamine (DEA), and/or triethanolamine (TEA). Treatment with alkanolamines involves circulating natural gas upward through a treatment tower to contact the alkanolamines. The acid gases react with the alkanolamines to form either a hydrosulfite or a carbonate of an alkanolamine. The alkanolamines admixed with the reaction products are conducted to a stripping still where the alkanolamines are removed and returned to the treatment column. The reaction products are then conducted to a reactor where they are heated sufficiently to reverse the process and regenerate the alkanolamines and release the acid gases which may be flared to convert $H_2S$ to sulfur dioxide, or further reacted to form for solid disposal, or sent to a sulfur manufacturing plant.

There are several variations on the alkanolamine desulfurization process in use. One such process is Shell Sulfinol process (licensed by Shell) which utilizes a mixed solvent. The Sulfinol solvent is an admixture of sulfolane, water and diisopropanolamine (DIPA). Another process of this type utilizes a mixture of alkanolamines with ethylene glycol and water. This process combines the removal of water vapor, $CO_2$ and $H_2S$.

Inorganic chemical-based systems, such as those containing nitrites, may also be used in scrubber towers. Although effective, such systems produce elemental sulfur solids. An example of such a system is marketed by NL Industries under the name "SULFACHECK" and disclosed in U.S. Pat. No. 4,515,759. "SULFACHECK" is a buffered aqueous solution of sodium nitrite which is injected into scrubber towers to sweeten natural gas. This solvent is designed for use in a one-step batch process, wherein the $H_2S$ is removed from a raw natural gas stream through a reaction with the sodium nitrite.

Such inorganic chemical-based sweetening materials are undesirable since, as noted above, they produce significant solids (i.e., elemental sulfur). Accordingly, such systems cannot be used in "in-line" injection systems and may only be used in bubble towers. Moreover, such inorganic chemical-based sweetening systems are not regenerable, i.e., they must be used in a batch process.

Another process for removal of $H_2S$, uses a solid/gas chemical reaction. An iron sponge, consisting of hydrated iron oxide on an inert support, is treated with the sour gas where the iron oxide is converted to the sulfide. The iron sulfide can be reoxidized to the oxide with release of elemental sulfur. When the spent iron sulfide is removed from the tower and exposed to air, a pyrophoric conditions may exist.

Some physical processes are used for removal of $CO_2$ and $H_2S$. Molecular sieves, i.e., zeolites and other materials having a pore size of molecular dimensions, which are specific in pore size for removal of $CO_2$ and $H_2S$ are used in the form of a bed through which the sour gas is passed. The bed is periodically regenerated by stripping with an inert gas. This process has the disadvantage present in most desulfurizing processes in that the separated $H_2S$ or sulfur dioxide must be disposed of in the field.

The above desulfurization process have the disadvantage that reaction vessels, strippers, stills, separators and the like must be provided, which have a high capital cost. Also, these processes have the disadvantage that the current laws dealing with air pollution make it difficult to dispose of the separated $H_2S$ or sulfur dioxide under field conditions.

There are several methods which have been developed for sweetening sour gas, i.e., for reducing the $H_2S$ content of natural gas, continuously. For example, various chemicals may be added or injected "in-line" to natural gas pipelines. These sweetening products may be injected at the well head, separators, glycol units, coolers, compressors, etc., to provide contact with the natural gas. The natural gas industry has a great need for a satisfactory agent for sweetening sour ($H_2S$-containing) gases. An industrially satisfactory sweetening agent must not produce solids as the reaction product with the $H_2S$ in the natural gas. The sweetening agent itself cannot be solid or particulate since it must be capable of in-line injection. Furthermore, the sweetening agent must be capable of reducing $H_2S$ from levels of 1000 p.p.m or higher down to 4.0 p.p.m. or less, preferably down to essentially zero.

Materials used with such "in-line" injection systems include, e.g., various aldehydes. The $H_2S$ reacts rapidly with the aldehyde compounds producing various types of addition products, such as polyethylene sulfide, polymethylene disulfide and trithiane. Such a process is disclosed, e.g., in Walker, J. F., Formaldehyde, Rheinhold publishing Company, New York, page 66 (1953).

Baize U.S. Pat. No. 4,748,011 discloses a method for the separation and collection of natural gas comprising the use of a sweetening solution. The sweetening solution consists of an aldehyde, a ketone, methanol, an amine inhibitor, sodium or potassium hydroxides and isopropanol. The amine inhibitor includes alkanolamines to adjust the pH.

Alkanolamines are also used to sweeten sour gas streams, e.g., in such "in-line" injection systems. Various alkanolamines may be used in such systems, e.g., monoethanolamine, diethanolamine, methyldiethanolamine and diglycolamine. For example, U.S. Pat. No. 2,776,870 discloses a process for separating acid components from a gas mixture comprising adding to the gas an absorbent containing water-soluble aliphatic amines and alkanolamines, preferably ethanolamine.

However, the alkanolamines are not selective in their reaction with $H_2S$. That is, alkanolamines absorb the total acid-gas components present in the gas stream, e.g., $CO_2$, as well as $H_2S$. Such non-selectivity is not desirable in many applications and therefore, the usage of alkanolamines has also come under disfavor for this reason.

Dillon U.S. Pat. No. 4,978,512 discloses the use of a reaction product of a lower alkanolamine and (ii) a lower aldehyde (where the reactants are formaldehyde and ethanolamine the reaction product is predominately N,N' methylene bisoxazolidine; 1,3,5tri-(2-hydroxyethyl)-hexahydro-S-triazine; or a mixture thereof) as a sweetening agent. The product is a tertiary amine, i.e., triazine, rather than a secondary amine, is poisonous, and has substantial amounts of alcohols and free formaldehyde, both of which are environmentally unacceptable.

Weers European Patent 411,745 discloses contacting liquid hydrocarbons containing hydrogen sulfide, with the reaction product of certain alkylene polyamines and formaldehyde. The alkylene polyamine recited is in the form of a formula which includes ethylene diamine as the lowest member. However, none of the working examples include ethylene diamine as the reactant and the reaction conditions and the type of formaldehyde used are substantially different from the reaction conditions and reactants used in the present invention.

Moore U.S. Pat. No. 3,970,625 discloses that 35-50% aqueous formaldehyde is used in the Mannich reaction of urea with formaldehyde, which is substantially different from the reaction disclosed in the present invention.

The in-line treatments as described in Baize U.S. Pat. No. 4,748,011 and Dillon U.S. Pat. No. 4,978,512 are available commercially in the form of sweetening solutions which are supplied for in-line injection or for use in treating towers. These solutions, however, present potential safety, handling and environmental problems.

These solutions generally require the presence of a substantial amount of methanol to prevent freezing at moderate temperatures and therefore have flash points which are low enough to present hazards in handling. Also, the presence of unreacted formaldehyde is an environmental hazard. Consequently, there is a present need for a sweetening solution which is as effective as the Baize and Dillon solutions in treating sour natural gas which is non-foaming, free from solids, has a low freezing point and a higher flash point and is free from alcohols and unreacted formaldehyde.

SUMMARY OF THE INVENTION

One of the objects of this invention is to provide a new and improved method and composition for sweetening sour natural gas at the well head, during collection, during transmission, or in a treating tower.

Another object of this invention is to provide a new and improved method and composition for sweetening sour natural gas by atomizing a new and improved non-foaming sweetening solution into a flowing stream of natural gas or into a treating tower.

Another object of this invention is to provide a new and improved method and composition for sweetening sour natural gas wherein the composition is a non-foaming sweetening solution characterized by low freezing point and a higher flash point than prior sweetening solutions.

Another object of this invention is to provide a new and improved method and composition for sweetening sour natural gas wherein the sweetening solution is substantially free of unreacted formaldehyde and methanol.

Still another object of this invention is to provide an new and improved method and composition for sweetening sour natural gas by atomizing a new and improved sweetening solution, produced by reaction of ethylene diamine with 50% uninhibited aqueous formaldehyde, into a flowing stream of natural gas or into a treating tower.

Still another object of this invention is to provide a new and improved method and composition for sweetening sour natural gas wherein the composition is a sweetening solution, produced by reaction of ethylene diamine with 50% uninhibited aqueous formaldehyde, characterized by low freezing point and a higher flash point than prior sweetening solutions.

Still another object of this invention is to provide a new and improved method and composition for sweetening sour natural gas wherein the composition is a sweetening solution, produced by reaction of ethylene diamine with 50% uninhibited aqueous formaldehyde, characterized by freedom from particulate solids in the reaction product.

Still another object of this invention is to provide a new and improved method and composition for sweetening sour natural gas wherein the composition is a sweetening solution, produced by reaction of ethylene diamine with 50% uninhibited aqueous formaldehyde, characterized by freedom particulate solids in the reaction product and in the reaction product formed when used to sweeten a sour natural gas.

Still another object of this invention is to provide a new and improved method and composition for sweetening sour natural gas wherein the sweetening solution, produced by reaction of ethylene diamine with 50% uninhibited aqueous formaldehyde, is substantially free of unreacted formaldehyde and methanol.

Another object of this invention is to provide a new and improved composition for sweetening sour natural gas comprising a sweetening solution, produced by reaction of ethylene diamine with 50% uninhibited aqueous formaldehyde characterized by low freezing point and a higher flash point than prior sweetening solutions.

Another object of this invention is to provide a new and improved composition for sweetening sour natural gas comprising a sweetening solution, produced by reaction of ethylene diamine with 50% uninhibited aqueous formaldehyde, which is substantially free of unreacted formaldehyde and methanol.

Other objects of this invention will become apparent from time to time throughout the specification and claims as hereinafter related.

DESCRIPTION OF THE PREFERRED EMBODIMENTS

This invention comprises a new and improved method of sweetening sour natural gas utilizing a new sweetening solution which is the reaction product of (i) commercially pure, i.e., 99%, ethylene diamine and (ii) 50% uninhibited aqueous formaldehyde and the method of use of such reaction product in sweetening a sour natural gas by reducing the level of $H_2S$ and organic sulfides therein. This composition and method may be used to selectively reduce the level of sulfides in both sour natural gas and liquified petroleum gas (e.g., butane) systems.

The improved method and composition provides a selective and almost instantaneous reaction with the sulfides present in the gas streams, producing no deleterious environmental effects. The effectiveness of the $H_2S$ reduction is not a function of the storage temperature, the gas temperature, the sulfide reaction temperature, or the pressure of the system. The new sweetening solution reacts with sulfides present in sour gaseous streams regardless of the $CO_2$ level in the stream, forming easily removable products. The sweetening solution of the present invention is extremely selective in its ability to react with sulfides, e.g., $H_2S$, carbonyl sulfides and carbon disulfides, etc., in the presence of any amount of $CO_2$. Such selective removal of sulfides is advantageous and economical, particularly in systems wherein a simultaneous reduction in the amount of $CO_2$ is not desirable.

The invention will now be illustrated further with reference to the following specific, non-limiting examples.

EXAMPLE 1

Preparation of Sweetening Solutions

The preparation of sweetening solutions according to the present invention is carried out by reacting commercially pure ethylene diamine with aqueous formaldehyde. The reactants used are 99% ethylene diamine and 50% aqueous formalin (uninhibited). The amine is stored in clean stainless steel tanks or drums to prevent iron contamination but reinforced plastic drums are acceptable if stainless is not available. The reactor is preferably of stainless steel and is cleaned before use.

The reactor is charged with 34 parts by weight of 99% ethylene diamine and sparged with nitrogen. The reactor is preferably provided with total reflux capacity but refluxing can be omitted if reaction conditions are otherwise carefully controlled.

50% aqueous formalin is continuously charged to the reactor at such a rate that the reaction temperature does not exceed 60° C. (140° F.). Reaction temperature is critical and cooling is used, if necessary, to keep temperature in the range of 55° C. (131° F.) to 60° C. (140° F.). The addition is continued until 66 parts by weight have been added. Development of a yellow color in the product is an indication that the reaction temperature is too high. The formalin may be added in increments if a continuous slow addition rate is not feasible, but incremental addition is difficult to control and can lead to off-color product formation, as well as, reducing the product quality.

When all formalin has been added, the temperature is kept within limits (55°-60° C.) for at least an additional hour. Then, the contents of the reactor and drum is cooled off or sent to storage. Higher temperatures may be used if the reaction is carried out under pressure. Stainless steel (304 or 316) is preferred for storage but plastic drums are accept-able for shipment.

The reaction product is water soluble, free from solids, and alcohol-free, i.e., free from methanol or other alcohols, has a pH of 10.5–11.5 and density of 1.09 and is water white to off-white in color. A very pale yellow color may be acceptable but yellow color reduces product quality. The reaction product obtained is a mixture of linear addition and condensation products, including a Schiff's base and cyclicized products thereof. Under these reaction conditions there is essentially no formation of triazines and/or bisoxazolidines.

The reaction product comprises about ⅔ Schiff's base and condensation and addition products, and ⅓ water and has a freezing point of about −70° F. and a flash point in excess of 160° F. This solution has a freezing point of about −50° F. when diluted to 50% water content and about 15° F. when diluted to 65% water content.

This sweetening solution is designed to remove $H_2S$ from production systems and in scrubbing towers. The reaction products in the solution will react with $H_2S$ (sour gas) to form stable reaction by-products that may be easily removed from the system.

Economical removal of $H_2S$ is obtained even in cold weather and in the presence of $CO_2$. The sweetening solution can be used in many methods of treatment. This product is shipped in 55 Gallon drums and in bulk as an unregulated material by current DOT standards. A Material Safety Data Sheet outlining recommended safe handling of this product is available from the manufacturer. The solution when diluted with water may be applied in a tower and each gallon can be expected to remove from between 15 and 35 ppm H$_2$S/Mmscf. The efficiency of the removal is dependent on overall field conditions.

EXAMPLE 2

Use of Sweetening Solutions

The sweetening solution produced according to Example 1 was utilized in sweetening natural gas using the apparatus shown in Baize U.S. Pat. No. 4,784,011. The sweetening solution was evaluated at full strength, i.e. ethylene diamine-formalin reaction product having 33% water content and also at varying degrees of dilution with water to a 66% water content.

At the various levels of dilution, the sweetening solution is applied from a tank and pumped through an injector in a spray to point or points in the line of gas flow in the pipe line or the collection system as in the Baize patent.

The flowing gas is analyzed from time to time to determine the H$_2$S content, and the flow of sweetening solution is adjusted to add an amount just sufficient for the reaction to remove the H$_2$S and other sulfur containing compounds.

Typically, 200–300 ppm of the sweetening solution per 100 ppm of H$_2$S (a 3:1 ratio being most effective) in the flowing natural gas stream injected into the flowing natural gas stream is effective to reduce the H$_2$S level to 4.0 ppm or less, which meets both industry and environmental standards and is more effective than the sweetening solutions in The Baize and Dillon patents at similar concentrations of active ingredients. Lower or higher concentrations of H$_2$S are similarly treated.

The amount of solution used depends on the content of the ethylene diamineformaldehyde reaction product required to react with the sulfur compounds. The solution is easily injectable, being non-foaming and free from solids which would plug the injection nozzle. The dilution with water is for ease of handling. The amount of water dilution which may be used depends largely on the temperature at which the sweetening process is to be carried out. In very cold climates, e.g., in Canada, Alaska, etc., the least dilute solutions are used, while in temperate climates a high degree of dilution is permissible. In the sweetening solutions of the Baize and Dillon patents, a certain amount of methanol is required to maintain fluidity and a reasonably low freezing point, but this lowers the flash point substantially which may give rise to safety problems.

EXAMPLE 3

Use in Scrubbing Towers

A commercial scrubber tower in which gas containing more than 400 ppm of H$_2$S was treated with the sweetening solution produced in accordance with Example 1.

The sweetening solution was charged into the tower and diluted to 66% water content. The scrubber tower contacted the solution with the natural gas stream in a continuous flow. There was no foaming and no formation of solids. The solution was spent in about two months. The concentration of H$_2$S in the gas was reduced to substantially 0 ppm.

The tower was drained and recharged without difficulty. No deposits (solids) were formed from the reaction of the sweetening solution with H$_2$S and no cleaning of the tower was required. The sweetening solution used here is more effective (has higher reaction rates) than the sweetening solutions in the Baize and Dillon patents at similar concentrations of active ingredients. In the sweetening solutions of the Baize and Dillon patents, a certain amount of methanol is required to maintain fluidity and a reasonably low freezing point, but, as noted above, this lowers the flash point substantially which may give rise to safety problems.

Comparisons with Procedure of Weers

Inasmuch as Weers discloses the use of polyamine/-formaldehyde reaction products for sweetening liquid hydrocarbon mixtures, a study of the Weers process and reaction products was made to compare it with the present invention. One might say that it would be obvious to scavenge with the ethylenediamine/formaldehyde product because Weers scavenges H$_2$S from liquid hydrocarbons with the reaction product of ethylenediamine and other polyamines and further that Weers mentions ethylene diamine as a possible reactant. The product of Weers may be satisfactory for crude oil and residual oil due to its physical state and oil solubility. However, due to physical state, i.e., being a solid, and solubility profile it is not suitable for water and natural gas treatment. Weers emphasizes residual oil fuels for sweetening, not natural gas. Weers emphasizes alkylene, straight or branched, of some length which favors oil solubility and consequently water insolubility. In Weers, a number of polyamines are listed as reactants, however, all of the polyamines listed other than the simplest diamines, ethylenediamine and propylenediamine, yield either an unreactive material or solids, when the procedure of Weers is followed. Furthermore, when ethylenediamine is used as a reactant and Weers' procedure is followed, the product is unsatisfactory as a sulfur-scavenging material.

Weers suggests scrubbing natural gas with his sweetening composition but gives no working examples (and could not since the material is not operable for the purpose). Experiments have shown that the reaction products produced by Weers are largely solids and the reaction products of the scavenging reaction are solids which is environmentally unacceptable. Injection of Weers' materials into a gas stream is virtually impossible in view of Weers' production of solids from the polyamines mentioned in his procedure. In Weers, the use of diethylenetriamine, yield solids not suitable for treating natural gas. The isopropyl alcohol and 37% formalin will, at reaction temperatures, first form an aldol condensation product and then excess moles of formalin will react to yield solid reaction products.

While the products of Weers are stated to be satisfactory for sulfide scavenging of oils, they are definitely unsuitable for treating natural gas. In fact, even the treatment of oils leaves unacceptable residues of sulfides and does not give commercially satisfactory reductions in sulfide level. None of Weers' examples reduces the sulfide levels to less than 500 p.p.m.

In the following Examples, experimental determinations were made of the factors just discussed above.

CONTROL

A sweetening solution was prepared in accord with Example 1 above.

The preparation of sweetening solutions was carried out by reacting commercially pure ethylene diamine with uninhibited (methanol-free) formaldehyde. The reactants used were 99% ethylene diamine and 50% aqueous formalin (uninhibited). The amine was stored in clean stainless steel tanks or drums to prevent iron contamination. The reactor was stainless steel and cleaned before use.

The reactor was charged with 34 parts by weight of 99% ethylene diamine and sparged with nitrogen. The reactor was provided with total reflux capability. 50% aqueous uninhibited, methanol-free, formalin was continuously charged to the reactor at such a rate that the reaction temperature did not exceed 60° C. (140° F.). The use of inhibited formalin is generally required in industry. Reaction temperature found to be critical and cooling was used to keep temperature in the range of 55° C. (131° F.) to 60° C. (140° F.). The addition was continued until 66 parts by weight were added. The mole ratio of ethylenediamine to formaldehyde was 1:2.

When all of the 50% aqueous uninhibited formalin was added, the temperature was kept within limits (55°-60° C.) for an additional hour. Then, the contents of the reactor and drum were cooled off. The reaction product was water-soluble, free of solids, had a pH of 10.5-11.5 and density of 1.09 and was water white to off-white in color. The reaction product obtained was a mixture of predominantly linear addition and some condensation products, including a Schiff's base and cyclized products thereof. Under these reaction conditions there is essentially no formation of triazines and/or bis-oxazolidines.

The reaction product was water soluble, free of solids, and comprised about ⅔ Schiff's base. condensation and addition products, and ⅓ water and had a freezing point of about −70° F. and a flash point in excess of 160° F. This solution had a freezing point of about −50° F. when diluted to 50% water content and about 15° F. when diluted to 65% water content.

This sweetening solution was found to be effective in removing $H_2S$ from natural gas production systems and in scrubbing towers. The water-soluble reaction products in the solution react with $H_2S$ (sour gas) to form stable reaction by-products that are easily removed from the system. There was no uncontrollable foaming. No solid reaction by-products were produced. This is highly significant since foaming makes the composition virtually impossible to handle in use and the presence of solids will plug the injection nozzles through which the sweetening solution is injected.

SCAVENGER EVALUATIONS

The prospective formulations for scavenging $H_2S$ were evaluated on laboratory apparatus that was designed to duplicate expected field conditions. The test gas was contaminated with 1000 ppm hydrogen sulfide ($H_2S$) and introduced through a sparger assembly into a given premeasured amount of the chemical to be tested. The sparger assembly is so designed to be able to accept, contain and detect surface active (foamy) materials. The amount of $H_2S$ remaining in the gas after passing through the scrubbing apparatus and solution was then measured by a state of the art solid state sensor detector that is currently being used extensively in the sour gas industry. This unit has one external modification which allows for real time data plotting and recording on a strip recorder. There was no uncontrollable foaming and no solid reaction by-products produced.

Utilizing the above test parameters the results can be directly correlated with actual field trial experiences.

Current pipeline contracts call for 0.25 grain $H_2S$/100 SCF (or less) which correlates to an accepted value of 4 ppm. From the above testing profile the chemical must be able to remove 99.6% of the $H_2S$ (at the 1000 p.p.m. or higher level) before reaching the stated 4 ppm. level. Or the chemical must be able to keep the level of $H_2S$ below 4 ppm for a minimum of 6 hours (for low volume sour systems) and preferably 8 hours.

Experience has shown that chemicals failing to meet this criteria are not effective in real world sour gas systems. The presence of solids in the reaction product (sweetening solution) or in the reaction by-products from the sweetening reaction will plug the injection nozzles in an injection system and the presence of foam will make handling almost impossible.

This testing profile is based on real time, ambient temperatures and pressures. It does not utilize artificial temperatures or pressures to change the scavenging reactions profiles or parameters or the reaction kinetics.

The sweetening composition produced above removed $H_2S$ down to below the 4 ppm level from the test gas containing 1000 ppm $H_2S$ with no solids being formed and no foaming.

The first comparison made was to establish the requirement that 50% uninhibited aqueous formaldehyde be used.

EXAMPLE 4

One Mole EDA+One Mole 37% Inhibited Formalin+20% IPA Preparation (Weers procedure) One mole of 99% ethylene diamine (EDA) was heated to 50° C. with 20% isopropyl alcohol (IPA) and one mole of 37% aqueous, methanol-inhibited formaldehyde added from a dropping funnel. The reaction was exothermic and the temperature rose to 55°-60° C. where it was cooled to 50°-60° C. It was stirred for one hour and then cooled to room temperature. The product obtained was a hazy liquid.

Testing

The product obtained in this example was used in an attempt to remove $H_2S$ from a sour natural gas using the scavenging apparatus and method described in the control. The solution foamed excessively on introduction into the gas stream and was unusable.

EXAMPLE 5

One Mole EDA+Two Moles 37% Uninhibited Formalin+20% IPA Preparation (Weers procedure) One mole of 99% ethylene diamine (EDA) was heated to 50° C. with 20% isopropyl alcohol (IPA) and two moles of 37% aqueous uninhibited formaldehyde added from a dropping funnel. The reaction was exothermic and the temperature rose to 55°-60° C. where it was cooled to 50°-60° C. It was stirred for one hour and then cooled to room temperature. The product obtained was a water white clear liquid.

Testing

The product obtained in this example was used in an attempt to remove $H_2S$ from a sour natural gas using the scavenging apparatus and method described in the control. The solution foamed excessively on introduction into the gas stream and was unusable, i.e., could not be handled.

EXAMPLE 6

EDA+37% Methanol-Inhibited Formalin+20% IPA Preparation (Weers procedure) One mole of 99% ethylene diamine (EDA) was heated to 50° C. with 20% isopropyl alcohol (IPA) and two moles of 37% aqueous methanol-inhibited formaldehyde added from a dropping funnel. The reaction was exothermic and the temperature rose to 55°-60° C. where it was cooled to 50°-60° C. It was stirred for one hour and then cooled to room temperature. The product obtained was a water white clear free flowing liquid.

Testing

The product obtained in this example was used in an attempt to remove $H_2S$ from a sour natural gas using the scavenging apparatus and method described in the control. The solution foamed excessively on introduction into the gas stream and was unusable, i.e., could not be handled.

EXAMPLE 7

One Mole EDA+Two Moles 50% Uninhibited Formalin+20% IPA Preparation (Weers procedure) One mole of 99% ethylene diamine (EDA) was heated to 50° C. with 20% isopropyl alcohol (IPA) and two moles of 50% aqueous uninhibited formaldehyde added from a dropping funnel. The reaction was exothermic and the temperature rose to 55°-60° C. where it was cooled to 50°-60° C. It was stirred for one hour and then cooled to room temperature. The product obtained was a water white clear liquid.

Testing

The product obtained in this example was used in an attempt to remove $H_2S$ from a sour natural gas using the scavenging apparatus and method described in the control. The solution foamed excessively on introduction into the gas stream and was unusable, i.e., could not be handled.

EXAMPLE 8

DETA+37% Methanol-Inhibited Formalin+20% IPA Preparation (Weers procedure) One mole of diethylene triamine (DETA) was heated to 50° C. with 20% isopropyl alcohol (IPA) and one mole of 37% aqueous methanol-inhibited formaldehyde added from a dropping funnel. The reaction was exothermic and the temperature rose to 55°-60° C. where it was cooled to 50°-60° C. It was stirred for one hour and then cooled to room temperature. The product obtained was a water white clear liquid.

Testing

The product obtained in this example was used in an attempt to remove $H_2S$ from a sour natural gas as in the control. The solution foamed excessively on introduction into the gas stream and was unusable, i.e., could not be handled.

EXAMPLE 9

DETA+37% Methanol-Inhibited Formalin+20% IPA Preparation (Weers procedure) One mole of diethylene triamine (DETA) was heated to 50° C. with 20% isopropyl alcohol (IPA) and two moles of 37% aqueous methanol-inhibited formaldehyde added from a dropping funnel. The reaction was exothermic and the temperature rose to 55°-60° C. where it was cooled to 50°-60° C. It was stirred for one hour and then cooled to room temperature. The product obtained was a water white clear liquid.

Testing

The product obtained in this example was used in an attempt to remove $H_2S$ from a sour natural gas using the scavenging apparatus and method described in the control. The solution foamed excessively on introduction into the gas stream and was unusable, i.e., could not be handled.

EXAMPLE 10

DETA+Methanol-Inhibited Formalin+20% IPA Preparation (Weers procedure) One mole of diethylene triamine (DETA) was heated to 50° C. with 20% isopropyl alcohol (IPA) and 3.14 moles of 37% aqueous methanol-inhibited formaldehyde added from a dropping funnel. The reaction was exothermic and the temperature rose to 55°-60° C. where it was cooled to 50°-60° C. It was stirred for one hour and then cooled to room temperature. The product obtained was a hazy yellow which exhibited excessive foam in the test apparatus and formed a scum-like insoluble residue (fine solids) in glass equipment.

Testing

The product obtained in this example was used in an attempt to remove $H_2S$ from a sour natural gas using the scavenging apparatus and method described in the control. The product was a hazy and yellow and exhibited excessive foam in the test apparatus forming a scum-like insoluble residue (fine solids) in the glass equipment and was unusable. The presence of fine solids in the product will plug the injection nozzles used in the sweetening process and render it inoperative.

EXAMPLE 11

Teta+37% Methanol-Inhibited Formalin+20% IPA Preparation (Weers procedure) One mole of triethylene tetramine (TETA) was heated to 50° C. with 20% isopropyl alcohol (IPA) and one mole of 37% aqueous methanol-inhibited formaldehyde added from a dropping funnel. The reaction was exothermic and the temperature rose to 55°-60° C. where it was cooled to 50°-60° C. It was stirred for one hour and then cooled to room temperature. The product obtained was a water white clear liquid.

Testing

The product obtained in this example was used in an attempt to remove $H_2S$ from a sour natural gas using the scavenging apparatus and method described in the control. The solution did not foam excessively in the test apparatus but exhibited so low scavenging efficiency as to be unusable commercially.

EXAMPLE 12

Teta+37% Methanol-Inhibited Formalin+20% IPA Preparation (Weers procedure) One mole of triethylene tetramine (TETA) was heated to 50° C. with 20% isopropyl alcohol (IPA) and two moles of 37% aqueous methanol-inhibited formaldehyde added from a dropping funnel. The reaction was exothermic and the temperature rose to 55°-60° C. where it was cooled to 50°-60° C. It was stirred for one hour and then cooled to room temperature. The product obtained was a water white clear liquid which gelled on standing overnight.

Testing

The product obtained in this example was used in an attempt to remove $H_2S$ from a sour natural gas using the scavenging apparatus and method described in the control. The solution gelled on standing overnight and thus could be not be used commercially.

EXAMPLE 13

Teta+37% Methanol-Inhibited Formalin+20% IPA Preparation (Weers procedure) One mole of triethylene tetramine (TETA) was heated to 50° C. with 20% isopropyl alcohol (IPA) and 2.1 moles of 37% aqueous methanol-inhibited formaldehyde added from a dropping funnel. The reaction was exothermic and the temperature rose to 55°-60° C. where it was cooled to 50°-60° C. It was stirred for one hour and then cooled to room temperature. After all the formalin was added, the mixture climbed the stirrer shaft and gelled. The product obtained was a gel which had to be cut from the reactor.

Testing

The product obtained in this example was used in an attempt to remove $H_2S$ from a sour natural gas using the scavenging apparatus and method described in the control. The solution could not be tested in the test apparatus because it gelled in the reactor and had to be cut out and thus would be unusable commercially.

EXAMPLE 14

Teta+37% Methanol-Inhibited Formalin+20% IPA Preparation (Weers procedure) One mole of triethylene tetramine (TETA) was heated to 50° C. with 20% isopropyl alcohol (IPA) and 3.95 moles of 37% aqueous methanol-inhibited formaldehyde added from a dropping funnel. The reaction was exothermic and the temperature rose to 55°-60° C. where it was cooled to 50°-60° C. It was stirred, but the product became insoluble and gelled after only 60% of the formalin was added. The product gel had to be cut from the reactor.

Testing

A gel or solid material can not be used in treating flowing gas streams and so the product was not tested.

While this invention has been described fully and completely with emphasis on certain preferred embodiments it should be understood that within the scope of the appended claims the invention may be practiced otherwise than as specifically described.

I claim:

1. A method for substantially eliminating $H_2S$ and organic sulfides present in a gaseous hydrocarbon stream containing $H_2S$ at a level of up to 1000 p.p.m. or more comprising
   contacting said stream with an alcohol-free sweetening composition which is an aqueous mixture consisting essentially of water and a reaction product of (i) undiluted commercially pure 99% ethylene diamine with (ii) 50% aqueous uninhibited formaldehyde, said reaction product being substantially free of formaldehyde, in a proportion of about 3:1 by weight reaction product/$H_2S$, for a period of time sufficient to substantially eliminate $H_2S$ and organic sulfides in said stream without foaming or producing solids, whereby $H_2S$ and organic sulfide in said gaseous hydrocarbon stream are reduced to a level of less than 4 p.p.m.

2. A method according to claim 1, in which said gaseous hydrocarbon stream is in a flow line.

3. A method according to claim 1, in which said gaseous hydrocarbon stream is in a scrubber or desulfurizing tower.

4. A method according to claim 1, in which said gaseous hydrocarbon stream is at a well head.

5. A method according to claim 1, in which said sweetening solution contains 33-67% wt. water and 67-33% wt. of said ethylene diamine/50% aqueous uninhibited formaldehyde reaction product.

6. A method according to claim 1, in which said sweetening solution consists essentially of a reaction product produced by reacting 34 parts by weight 99% ethylene diamine with 66 parts by weight 50% aqueous uninhibited formaldehyde, by incrementally adding the aqueous uninhibited formaldehyde to the 99% ethylenediamine.

7. A method according to claim 6, in which said reaction product is produced by reaction at 55°-60° C.

8. A method according to claim 1, in which said reaction product is obtained by placing 99% ethylene diamine in a reactor and incrementally or continuously adding 50% aqueous uninhibited formaldehyde, in a mole ratio of ethylene diamine to formaldehyde of about 1:2, at 55°-60° C. to produce a reaction mixture and maintaining said reaction mixture at 55°-60° C. until reaction is complete.

9. A method according to claim 8, in which said reaction mixture is maintained at 55°-60° C. for about one hour after completion of adding said formaldehyde.

10. A method according to claim 9, in which said product being an aqueous solution of a mixture of reaction products, including a Schiff's base and cyclic products thereof, and linear addition and condensation product, and is free of unreacted formaldehyde and methanol.

* * * * *